June 7, 1938.  R. S. RICHARDSON  2,119,721
METHOD OF PREPARING NH3 AIR MIXTURES
Filed June 26, 1936
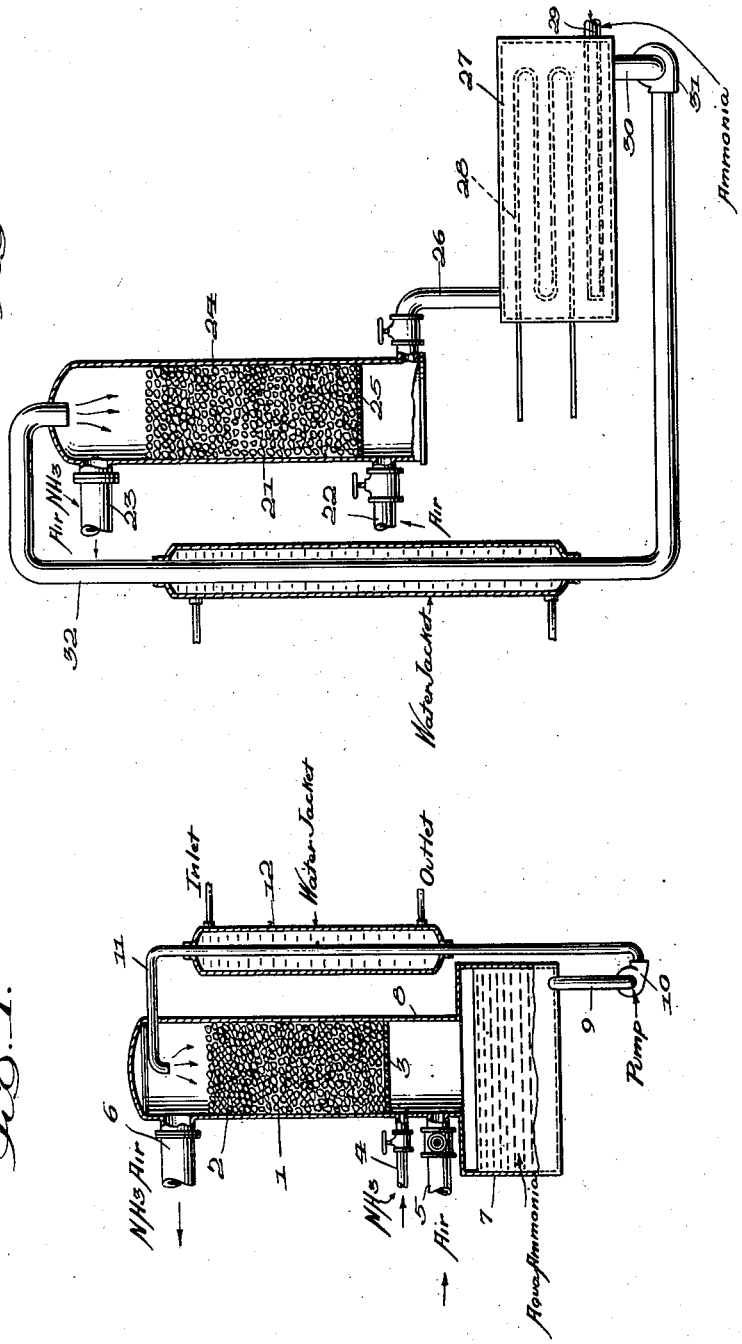
Inventor
Ralph S. Richardson,
By Wm. P. Spielman
Attorney Patented June 7, 1938

2,119,721

UNITED STATES PATENT OFFICE 2,119,721

METHOD OF PREPARING NH₃-AIR MIXTURES

Ralph S. Richardson, Scarsdale, N. Y., assignor to Chemical Construction Corporation, New York, N. Y., a corporation of Delaware Application June 26, 1936, Serial No. 87,423

2 Claims. (Cl. 23—5)

This invention relates to the preparation of gas mixtures of constant composition, and is primarily designed for the preparation of mixtures of this type for use in catalytic reactions. Many gas phase reactions, such as the synthesis of ammonia from nitrogen-hydrogen mixtures, the synthesis of methanol from carbon monoxide or carbon dioxide and hydrogen, the water gas reaction wherein carbon monoxide is reacted with steam and other processes of this type require the use of gas mixtures in which the ratio of the reacting gases is carefully controlled.

A special class of processes of this nature to which the present invention is particularly applicable is one in which the vapor phase reaction is an oxidation reaction, and the gas mixture contains oxygen in the form of air or other oxygen containing mixture in controlled amounts. Reactions of this type are, for example, the Deacon chlorine process in which HCl gas and air are reacted for the production of chlorine, the production of oxides of nitrogen by the oxidation of ammonia with air in the presence of a platinum or non-platinum catalyst, the oxidation of $SO_2$ to $SO_3$ in the production of sulfuric acid, the oxidation of $H_2S$ with air for the production of sulfur or sulfur dioxide, and the vapor phase catalytic oxidation of aliphatic or aromatic hydrocarbons or other organic compounds to organic acids, aldehydes and ketones. In all these processes, it is of utmost importance to maintain a close control of the ratio of the reacting gases and this is particularly true in the case where air or oxygen is the reacting medium since these reactions usually do not take place in a closed cycle.

In accordance with the principles of the present invention, the above and similar gas mixtures are prepared with closely controlled compositions by the agency of liquids having constant vapor pressures. Preferably, the liquid consists of or contains one or more components of the gas mixture which it is desired to produce, and means are provided for passing other components of the gas mixture through or in contact with the liquid phase under conditions such that the vapor pressure of the liquid is controlled within narrow limits. The result of this procedure is that the gas mixture as obtained has a vapor pressure with respect to the component or components derived from the liquid phase which is the same as the vapor pressure of that component in the liquid itself, whereby a close control of the gas composition is automatically maintained.

The invention should be carefully distinguished from systems of the prior art in which reaction gas mixtures are created by spraying or otherwise contacting a liquid component to be vaporized with air or other gas, for the present invention is not primarily concerned with the creation of mixtures of this type. On the contrary, the invention is primarily designed to operate as a control for reaction gas mixtures that have already been prepared in approximately correct ratios, and its chief advantage lies in the fact that it will automatically smooth out and correct temporary irregularities occurring in such mixtures with no loss in the valuable reaction components and at a very small cost for equipment and power consumption.

The invention will be illustrated by a detailed description of the preparation of ammonia-air mixtures for use in the catalytic production of oxides of nitrogen for nitric acid plants and other purposes, but it is to be understood that the principles embodied therein are by no means limited to this specific process, but are of general applicability to the preparation of any of the gas mixtures above enumerated or to others having similar characteristics. On the other hand, however, certain of the more specific aspects of the invention are especially suited to the production of reaction mixtures containing air or other oxidizing gases, and constitute a specific field of invention in conjunction with the problems arising in the control of reaction gas mixtures of this nature. Accordingly, it is understood that certain of the features of the more specific claims appended hereto are believed to be patentably novel in themselves without, however, limiting the broader concepts of the invention.

Referring now to the drawing, which is more or less diagrammatic:

Fig. 1 is an illustration of an installation for maintaining a constant composition of gases supplied at the same pressure.

Fig. 2 illustrates an installation for use when gaseous components are supplied at pressures other than those desired, and where one or more of the components are supplied separately to the system.

In adapting the invention to the control of ammonia-air mixtures there are certain specific requirements which should be observed. Present day ammonia oxidation plants using the ordinary platinum or platinum-rhodium catalyst screens operate at temperatures of 850–1050° C. with ammonia-air mixtures having an ammonia content of approximately 9–10%, and this ratio must be closely controlled both in order to avoid loss of efficiency in the absorption systems and because of the danger of explosion if the ammonia content is permitted to become too high. It is one of the more specific objects of the present invention to provide a method of maintaining mixtures of the above concentration at a uniform ammonia content even when the source of ammonia supply is subject to variation within limits, and to provide an apparatus having a low construction and maintenance cost which is semiautomatic in operation.

With the above objects in mind, reference to the drawing will show that their accomplishment is based upon the recirculation of a relatively large volume of aqua ammonia in contact with the gas mixture passing to the ammonia burner or converter under conditions such that equilibrium is attained. When this condition is brought about between the gases and the liquid, the partial pressure due to ammonia in the gas will, of course, be equal to the partial vapor pressure of ammonia in the liquid. Accordingly, in practicing the invention it is only necessary to supply a recirculating stream containing aqua ammonia under conditions such that its vapor pressure with respect to ammonia corresponds to that desired in the ammonia-air mixture and this concentration will automatically be maintained when equlibrium is established. Since the partial pressure of the aqua ammonia solution with respect to ammonia is dependent upon the temperature, the concentration of ammonia in the solution, and the absolute pressure within the stripping tower, it is apparent that ammonia-air mixtures of any desired ammonia content can be obtained by suitable control of these conditions and that a constant ratio of ammonia to air will be maintained in the gas stream irrespective of variations in its composition or rate of flow and without the necessity of controlling the rate of recirculation of the aqua ammonia. In otherwords, so long as the vapor tension of ammonia in the recirculating liquid is maintained constant at the desired point, an ammonia-air mixture of corresponding uniform concentration will always be obtained and no variations in the efficiency of the plant will occur.

The above principles may be applied to plants operating on ammonia from any source, and are equally applicable to both vaporized anhydrous ammonia and to ammonia from the stripping of by-product or other ammonia liquor. Similarly, they may be applied either to the formation of ammonia-air mixtures of constant composition from separte streams of ammonia and air or to the control of preformed mixtures of this type.

Referring to Fig. 1 of the drawing, the installation consists preferably of a tower 1 having packing 2 supported on a perforated plate or other support 3, the height of the packing being such that equilibrium between the gases and liquid is obtained under the conditions of operation. Ammonia and air inlets 4 and 5 are provided adjacent the base of the tower below the support 3 while an outlet pipe 6 adjacent the top of the tower carries away the regulated ammonia-air mixture.

In accordance with the present invention a tank 7 is provided in communication with the base 8 of the tower, in such a manner as to collect liquid therefrom. This tank is of relatively large capacity as compared with the tower volume, and is equipped with an outlet pipe 9, pump 10 and recirculating pipe 11 for supplying aqua ammonia into the top of the tower and continuously drenching the packing therein. If desired, a water jacket 12 or other temperature regulating means may be provided in the circuit.

In operation, controlled amounts of ammonia and air may be separately supplied to the base 8 of the tower, or the two gases may be supplied in the form of a mixture through a single inlet pipe. The composition of these gases is usually fairly uniform and they are normally applied at such rates as to produce a mixture of the average ammonia concentration which is desired, but temporary fluctuations in the strength thereof may occur from various causes. These gases pass up through the tower in countercurrent to the aqua ammonia of constant composition recirculated through the pipe 11, and the ammonia concentration becomes finally adjusted in accordance with the vapor tension thereof with respect to ammonia. Since a relatively large amount of aqua ammonia is recirculated as compared with the amount of ammonia that can be taken up or given off from the gases in any period of time, the aqua ammonia is discharged from the base of the tower at approximately the same strength that it enters, while the gases leave the tower through the pipe 6 with the desired ammonia content.

The operation of the invention in accordance with the above described installation may be illustrated by the following example: if the operating pressure of the ammonia-air mixture is to be 800 mm. of mercury and the mixture is to contain 9% by volume of $NH_3$, the partial pressure of the ammonia in the ammonia-air mixture will be 72 mm. of mercury. Accordingly, aqua ammonia having this vapor pressure with respect to ammonia is supplied to the tank 7 and is recirculated through the system. This vapor pressure is obtained with a 7% aqua ammonia solution at a temperature of 30° C. or with a 9% solution at a temperature of 20° C.

In the above installation it will be noted that, if the flow of ammonia gas and air through the pipes 4 and 5 is accurately controlled neither absorption nor stripping of ammonia from the aqua ammonia liquor takes place, this liquor merely serving to wash the ammonia-air mixture free from dust or impurities noxious to the oxidation catalyst. If, however, slight irregularities occur in the preliminary control of the ratio of ammonia gas and air supplied to the tower the circulation of aqua ammonia acts to adjust the ratio to the desired value, either by absorbing an excess of ammonia or by giving off ammonia when the feed of gaseous ammonia falls below the desired amount. As has been stated the dimensions of the apparatus and the capacity of the aqua ammonia circulation and storage are such that no material variation in the strength of the aqua ammonia can take place, and the actual volume ratio is determined by the degree of control desired. As a practical matter, I have found that an hourly circulation of aqua ammonia containing as $NH_3$ approximately ten times the hourly consumption of ammonia gas and an aqua ammonia storage equivalent to one hour's circulation should be sufficient to correct the ammonia-air mixture under ordinary operating conditions.

It is apparent that the operation in accordance with Fig. 1 of the drawing is independent of the absolute pressure under which the finished ammonia-air mixture is to be obtained, since the dominant factor is the vapor pressure of ammonia in the recirculating liquid. For example, if an ammonia-air mixture having an absolute pressure of 5 atmospheres and a concentration of 10% ammonia by volume is desired, the partial pressure of ammonia equals 380 mm. Hg. A 21% aqua ammonia solution has this vapor pressure with respect to ammonia at 30° C., and a 26% solution at 20° C. Accordingly, the recirculation of either of these solutions through the tower at the temperatures mentioned will produce the desired air-ammonia mixtures when a suitable ammonia-air mixture which may be of fluctuating composition is introduced into the base of the tower.

Fig. 2 shows a method of carrying out the invention which is particularly adaptable to cases when ammonia gas is available at pressures lower than those at which the ammonia-air mixture is to be supplied to the burner. This is frequently the case in modern nitric acid plant operation, wherein ammonia is burned at pressures of 2-8 atmospheres while the gases obtained from ammonia stripping columns may be at atmospheric or even sub-atmospheric pressures. In such cases, the present invention permits not only the obtaining of a constant ammonia-air ratio but also the pumping of such ammonia into the pressure system as an aqueous solution rather than as a gas.

In general the apparatus used in the installation of Fig. 2 is similar to that of Fig. 1, and consists of a packed tower 21 of suitable height, constructed to withstand operating pressure and having an air inlet 22 in its base and an ammonia-air outlet 23 in its upper portion. The tower is provided with packing 24 supported upon a perforated plate 25, of a type suitable for promoting the contact between the air and the descending stream of aqua ammonia in order to obtain equilibrium.

The base of the tower is provided with a valved outlet 26 which leads to an ammonia absorber 27 which may have temperature regulating coils 28 and which is provided with a perforated inlet pipe 29 for the injection of ammonia under low pressure therein. The tower operates under the desired pressure of the ammonia-air mixture, while the absorber 27 may be maintained at a lower pressure. Outlet pipe 30 and pump 31 and jacketed recirculating pipe 32 are provided as in Fig. 1. While the drawing shows the absorber as being placed at a level below that of the tower 21, it is understood that in practice this absorber would preferably be mounted above the level of the tower in order to reduce the power requirements for the aqua ammonia circulating pump. The temperature regulating coils 28 and the water jacket are optional and may be omitted, for it is apparent that the solution heat of ammonia developed in the absorber 27 is exactly counterbalanced by the heat of vaporization in the tower 21.

The operation of this installation will be illustrated by the following example: the pressure of the ammonia-air mixture is 5 atmospheres absolute and a 10% ammonia-air mixture is desired. In this case the partial pressure of ammonia in the ammonia-air mixture and in the recirculating aqua ammonia equal 380 mm. of mercury. Accordingly, the strength of the aqua ammonia at 30° C. would be 21% and at 20° C. would be 26%.

In practice, aqua ammonia of a strength corresponding with the selected temperature is charged into the absorber 27 through the pipe 29 and additional ammonia is continuously or intermittently added to maintain this strength during operation. Ammonia liquor of the required concentration will then be continuously injected into the top of the tower 21. The air entering at 22 passes up the tower and leaves through the outlet 23 at equilibrium with this incoming liquor, that is to say, it leaves with a partial pressure with respect to ammonia of 380 mm. of mercury. The volume of recirculating ammonia liquor is so large that equilibrium is maintained at the top of the tower irrespective of slight fluctuations in the air supply, and an ammonia-air mixture of constant composition is thereby obtained.

It is believed that the above detailed description of the invention in conjunction with the preparation of ammonia-air mixtures will constitute a sufficient illustration of the principles thereof to enable the same to be applied to other processes. Broadly stated, these principles involve the passage of a flow of the oxidizing medium such as air, or another of the gaseous reaction constituents, in countercurrent with a recirculating flow of a liquid consisting of or containing in solution another of the constituents of the reaction mixture, while controlling the partial vapor pressure of the liquid with respect to the last named reaction component at a value equal to the desired partial pressure of this component in the reaction mixture. When this is accomplished, by either of the systems above described or by their equivalents, and when the volume of the recirculating liquid is sufficiently large compared with the amount of the component taken up by the gas per unit of time, then the system will automatically operate to smooth out any irregularities in the gas supply and deliver a gas mixture of constant composition.

What I claim is:

1. A method of producing an ammonia-air mixture of substantially constant composition which comprises preparing a mixture of ammonia and air having approximately the desired composition, and passing said mixture in countercurrent contact with a recirculating flow of an aqueous ammonia solution having a partial vapor pressure with respect to ammonia equal to the desired partial pressure of ammonia in the ammonia-air mixture, the time of contact being sufficient to establish equilibrium between the ammonia in the gas and the solution the volume of the ammonia solution recirculated being relatively large in comparison with the amount taken up or given off by the gas per unit of time.

2. A method of producing an ammonia-air mixture of substantially constant composition which comprises preparing a mixture of ammonia and air having approximately the desired composition, and passing said mixture in countercurrent contact with a recirculating flow of an aqueous ammonia solution having a partial vapor pressure with respect to ammonia equal to the desired partial pressure of ammonia in the ammonia-air mixture, the time of contact being sufficient to establish equilibrium between the ammonia in the gas and the solution the volume of ammonia recirculated being at least ten times that taken up or given off by the gas per hour.

RALPH S. RICHARDSON.